United States Patent [19]

Sato et al.

[11] Patent Number: 4,559,814

[45] Date of Patent: Dec. 24, 1985

[54] THERMAL AIR FLOW METER

[75] Inventors: Kanemasa Sato; Sadayasu Ueno, both of Katsuta, Japan

[73] Assignee: Hitachi, Ltd., Tokyo, Japan

[21] Appl. No.: 585,194

[22] Filed: Mar. 1, 1984

[30] Foreign Application Priority Data

Mar. 7, 1983 [JP] Japan .................................. 58-35957

[51] Int. Cl.$^4$ ............................................... G01F 1/68
[52] U.S. Cl. ......................................... 73/118; 73/204
[58] Field of Search .................... 73/204, 118; 338/25, 338/296

[56] References Cited

U.S. PATENT DOCUMENTS 2,838,639  6/1958  Planer et al. ......................... 338/296
3,747,577  7/1973  Mauch et al. .
4,264,964  4/1981  Nishimura et al. .
4,304,128  12/1981  Hafner .
4,369,656  1/1983  Ueno et al. ........................... 73/204
4,393,697  7/1983  Sato et al. ............................. 73/118

Primary Examiner—Herbert Goldstein
Attorney, Agent, or Firm—Antonelli, Terry & Wands

[57] ABSTRACT

A thermal air flow meter is equipped with a flow rate detector utilizing the phenomenon that heat is carried away in proportion to flow rate. The flow rate detector comprises a support, a heat-sensitive resistor formed on the support and leads attached to both ends of the support. To make the temperature distribution uniform, the heat-sensitive resistor is formed in such a manner that the resistance per unit length of the heat-sensitive resistor at either end of the support is greater than the resistance per unit length of the heat-sensitive resistor at the center of the support. This arrangement can provide a thermal air flow meter which has a rapid response to changes in flow rate.

4 Claims, 12 Drawing Figures

THERMAL AIR FLOW METER

BACKGROUND OF THE INVENTION

This invention relates to a thermal air flow meter, and, more particularly, to a thermal air flow meter suitable for measuring the quantity of air taken in by an internal-combustion engine.

Various systems for measuring the quantity of air taken in by an internal-combustion engine have been known in the past, such as movable vane types, types utilizing Karman's vortex sheets, and so forth. Thermal air flow meters disclosed in, for example, U.S. Pat. Nos. 3,747,577 and 4,304,128 have recently gained wide application because they usually have a rapid response and can measure the mass flow rate of the air. A thermal air flow meter of the aforementioned type includes a platinum wire of a diameter of between 70 $\mu$m and 100 $\mu$m stretched within an intake pipe of an internal combustion engine to act as a flow rate detector. A disadvantage of this construction resides in the fact that the thermal air flow meter does not have sufficient durability when the internal-combustion engine is running badly, and the flow meter undergoes mechanical damage due to backfiring.

In, for example, U.S. Pat. No. 4,264,961, an improved thermal air flow meter solving this problem is proposed wherein a part of the air flowing through the intake pipe is led into a by-pass pipe, and the platinum wire, acting as the flow rate detector, is mounted in this by-pass pipe. Since the by-pass pipe has a maximum diameter of 1 cm, the flow rate detector must also be compact. However, since the flow meter measures flow rate by utilizing the phenomenon that the resistance of platinum wire varies with temperature, a higher sensitivity can be obtained by a higher-resistance platinum wire. Accordingly, the flow rate detector is constructed by winding platinum wire around the outer periphery of a piece of insulating material to make the flow meter compact and increase its resistance. With this construction, however, another problem occurs in that the response is lower than that of the system described above, because of the heat capacity of the bobbin used as the support. This problem is not limited to the type of meter which utilizes a by-pass pipe, but also to any meter which utilizes a compact flow rate detector.

The response problem is more critical when the thermal air flow meter described above is, for example, used for a single-point fuel injection system.

In single-point fuel injection, a single injection valve is provided at a point at which the intake pipes of the engine join, and hence the distances from the fuel injection position to the cylinder inlets is longer than those in multi-point fuel injection, and the time taken for the fuel to arrive at the cylinders is longer. Similarly, since the distance from the fuel injection valve to each cylinder differs from cylinder to cylinder, delicate matching must be carried out. Although attempts have been made to compensate for the difference by use of computer software, these have not been entirely successful. After all, in single-point injection, only one injection valve distributes fuel to each cylinder so that delicate matching must be made whenever the model of the car, and hence the shape of the intake pipes, changes. Particularly during acceleration or during high-speed operation, the detection accuracy must be improved so that the pulsating flow of intake air in the engine can be followed precisely, using a highly accurate flow rate sensor.

This problem of response occurs not only in the control of an internal-combustion engine, such as in the single-point fuel injection system, but also in the measurement of flow rates in general if changes in such flow rates are rapid.

It is therefore an object of the present invention to provide a thermal air flow meter which is equipped with a compact flow rate detector, but which still provides a rapid response.

In a thermal air flow meter equipped with a flow rate detector utilizing the phenomenon that heat is carried away in proportion to the flow rate, the thermal air flow meter in accordance with the present invention is characterized in that the flow rate detector comprises a support, a heat-sensitive resistor formed on the support, and leads attached to both ends of the support. The heat-sensitive resistor is formed on the support in such a manner that the resistance per unit length of the heat-sensitive resistor at either end of the support is greater than the resistance per unit length of the heat-sensitive resistor at its center.

Various experiments and studies have been carried out using conventional flow rate detectors of the wound type, and have clarified the following points.

In a conventional flow rate detector, platinum leads which function both as supports and conductors are attached to both ends of a 2 mm-long bobbin made of an insulating material, and platinum wire is wound at constant pitch onto this bobbin. When a current flows through the platinum wire and the heat thus generated is controlled so that the wire is at a predetermined temperature, the temperature distribution is such that it is highest at the center and drops towards the leads. Accordingly, when the set temperature for the flow rate detector is, for example, 170° C., (this can be effected by making the resistance of the flow rate detector a predetermined value), the maximum temperature at the center is about 250° C.

The reason why the temperature distribution is so large can be attributed to the following. In the initial stages when the current starts to flow through the resistance wire, the quantity of heat generated per unit length is the same; but as the heat is transferred, temperature differences occur between the glass coating, the bobbin, and the leads that are in contact with the winding. These temperature differences change the resistance of each part of the resistance wire. For instance, the resistance rises locally at the center, further increasing the quantity of heat generated. When specific structures are examined, it is first of all obvious that the bobbin center is hollow while the two end portions hold the leads and adhesive for the leads, so that they have different volumes which induce differences in heat capacity. Secondly, heat sinks are generated from both end portions because leads of a precious metal are fitted.

In accordance with the present invention, since the resistance of the bobbin is smaller at the center thereof than that at either end, heat generation is less at the center of the bobbin and is more at either end, so that the present invention can provide a thermal air flow meter in which the temperature distribution along the flow rate detector can be made substantially uniform, and which has a rapid response.

The resistance of the heat-sensitive resistor per unit length at the center of the bobbin can be easily made different from that at either end by winding the resistor onto a support coarsely at the center and densely at either end, if the heat-sensitive resistor is a wire, or by making the trimming pitch dense at either end and coarse at the center if it is produced by trimming after the formation of a film.

DETAILED DESCRIPTION

Figure 1:
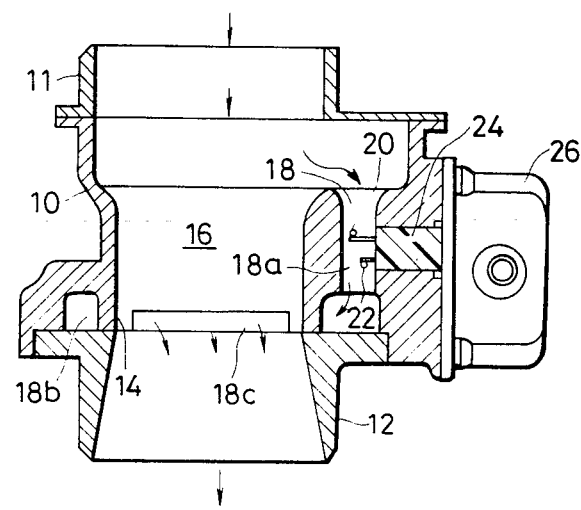
FIG. 1 is a section through a thermal air flow meter measuring the quantity of air taken in by an internal-combustion engine, in accordance with one embodiment of the present invention.
Figure 2:
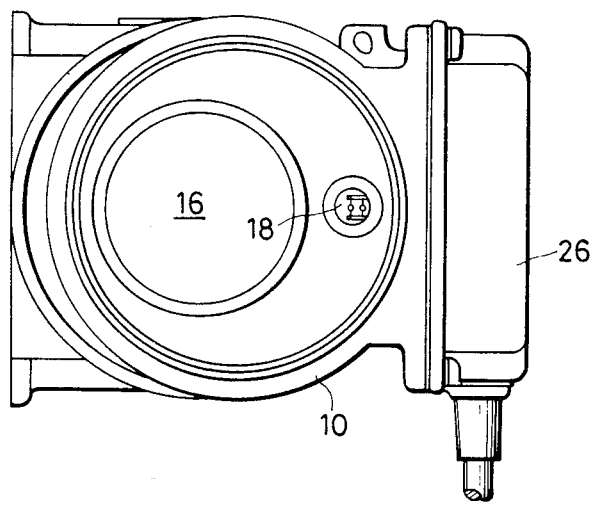
FIG. 2 is a plan view of a portion of the thermal air flow meter of FIG. 1.
Figure 3:
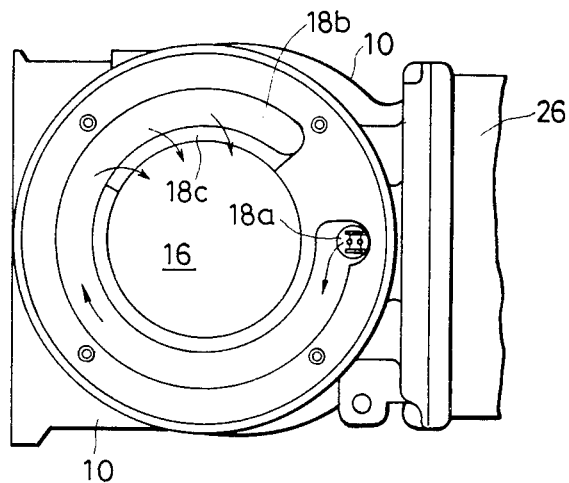
FIG. 3 is a bottom plan view of FIG. 1 with the skirt portion is removed.

Referring now to the drawings wherein like reference numerals are used throughout the various views to designate like parts and, more particularly, to FIGS. 1-3, according to these figures, a thermal air flow meter suitable for measuring the quantity of air taken in by an internal-combustion engine includes a body portion 10, formed by aluminum die casting, a head portion 11 fitted onto the body portion 10, with an air cleaner (not shown) being connected upstream of the head portion. A skirt portion 12, formed by aluminum die casting is connected at downstream end thereof connected to an engine (not shown). Part of each of the inner walls of the portion 10 and skirt portion 12 forms form a venturi portion 14. A by-pass passage 18 is formed in the body portion 10 as well as a main passage 16, with the by-pass passage 18 including a linear portion 18a which is parallel to the main passage 16, and a curved portion 18b surrounding the main passage 16.

As shown most clearly in FIG. 3, the curved portion 18b of the by-pass passage 18 surrounds about ¾ of the main passage 16. As shown in FIG. 1, the outlet 18c of the by-pass passage 18 is shaped as a laterally elongated slot. A heat-sensitive resistor 20, for measuring the air flow rate, and a heat-sensitive resistor 22, for compensating for the air temperature, are positioned as sensors inside the linear portion 18a of the bypass passage 18. The two heat sensitive resistors 20, 22 are attached to support pins which are connected to an electric circuit within a circuit case 26, through a piece of heat-insulating material 24. Hot wire resistors or hot film resistors may be used as the heat-sensitive resistors 20, 22, these resistors will be described elsewhere in further detail.

Figure 4:
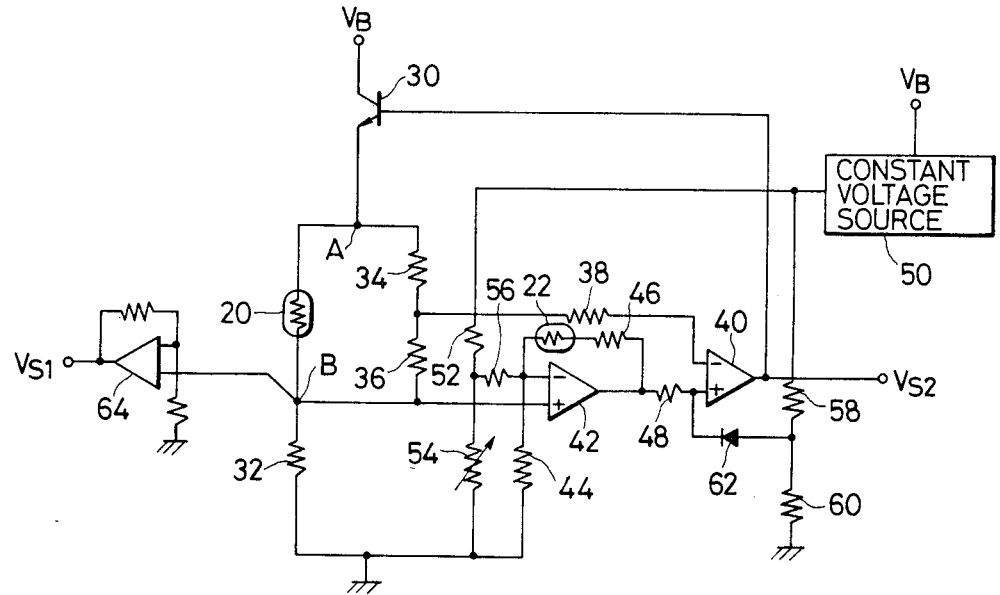
FIG. 4 is a circuit diagram of the thermal air flow meter constructed in accordance with one embodiment of the present invention.

In the electric circuit of FIG. 4, a voltage $V_B$, from a power source such as a car, is applied to the heat-sensitive resistor 20 for measuring the flow rate, through a transistor 30. A resistor 32 is connected in series with the heat-sensitive resistor 20, and is used for measuring a current flowing through the heat-sensitive resistor 20. The voltage across the ends of the heat-sensitive resistor 20 is divided by resistors 34, 36. The divided voltage is applied to one of the input terminals of a differential amplifier 40 through a resistor 38. The negative input of an amplifier 42 is grounded by a resistor 44. The heat-sensitive resistor 22 for temperature compensation and a resistor 46 function as feedback resistors for the amplifier 42. The output of the amplifier 42 is applied to the positive input of the amplifier 40 through a resistor 48. Accordingly, the amplifier 40 produces an output by amplifying the divided voltage across the two ends of the heat-sensitive resistor 20 and the voltage at a junction B between the heat-sensitive resistor 20 and the resistor 32 by an amplification factor in response to the ambient temperature, so that it is equal to the voltage amplified by the amplifier 42. The output of the amplifier 40 is applied to the base of the transistor 30 and the amplifier 40 produces an output such that the output is equal to this input, thereby controlling the transistor 30. As a result, the heat-sensitive resistor 20 is maintained at a predetermined temperature of about 170° C. higher than the ambient temperature of the heat-sensitive resistors 20, 22.

A series circuit of a resistor 52 and a variable resistor 54 is connected to a constant voltage source 50, with a junction of the resistors 52, 54 connected to the negative input of the amplifier 42 through a resistor 56, and with the resistors 52, 54 being used for offset adjustment. The output of the constant voltage source 50, connected to the battery voltage $V_B$, is divided by resistors 58, 60, with a junction of the resistors being connected to the positive input of the amplifier 40 by a diode 62. This circuit is a starting circuit, when the key switch of a vehicle is turned on, a predetermined voltage is applied through the diode 56 so that the two inputs to the amplifier 40 become different, and an output is forced from the amplifier 40. The junction of the heat-sensitive resistor 20 and the resistor 32 is connected to an amplifier 64. The amplifier 64 produces an output which is the voltage across the two ends of the resistor 32. Since the resistance of the resistor 32 is constant, the output $V_{S1}$ of the amplifier 68 indicates the current flowing through the resistor 32, that is, the current flowing through the heat-sensitive resistor 20, and is a signal indicating the air flow rate. The output $V_{S2}$ of the amplifier 40 also indicates the current flowing through the heat-sensitive resistor 20, and is an air flow rate signal.

Figure 5A:
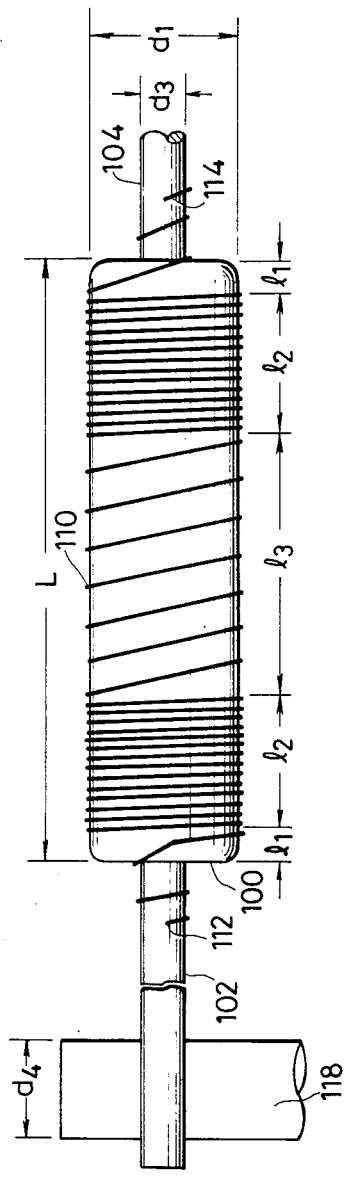
FIG. 5A is a photomicrograph side view of the flow rate detector of the thermal air flow meter in accordance with one embodiment of the present invention at a magnification of fifty.
Figure 5B:
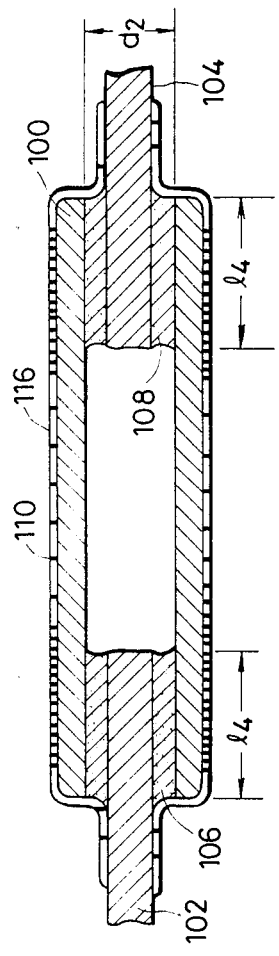
FIG. 5B is a longitudinal cross-sectional view of the detector of FIG. 5A at a magnification of fifty.

As shown in FIGS. 5A, 5B, in a heat-sensitive resistor acting as a flow rate detector, platinum leads 102, 104 are inserted into either end of a hollow alumina bobbin 100 and are bonded by borosilicate glass 106, 108, respectively. A platinum wire 110 is wound around the outer periphery of the bobbin 100 in such a manner that the coil produced is coarser at the center and denser at either end. In other words, this winding method is different from the conventional uniform winding. Both ends 112, 114 of the platinum wire 110 are spot-welded to the leads 102, 104, respectively. Lead glass is also applied around the platinum wire 110 and is baked at 600° C. to form a 10μ to 20μ-thick protective film 116. Both ends of the leads 102, 104 are spot-welded to support pins 118 (the right-hand support pin is omitted in the drawing).

The bobbin 110 may be made of any electrically insulating material, such as, for example, magnesia and zirconia, besides alumina. Other metallic wires can be used as the leads 102, 104, so long as they are electrically conductive. Platinum paste or metal alloys can be used as the adhesive 106, 108. The platinum wire 110 may be substituted by other metal wires so long as they are electrically conductive and have a large coefficient of thermal resistance, but from the aspect of stability, platinum is preferred.

The dimensions of each part of the embodiment shown in FIGS. 5A and 5B are as follows:
  Total length (L) of bobbin 100: 2 mm
  Length $l_1$ at each end of bobbin 100 at which dense winding of platinum wire is difficult: 0.1 mm
  Length $l_2$ at each end of bobbin 100 over which platinum wire is wound densely: 0.45 mm
  Length $l_3$ of the center of bobbin 100 over which platinum wire is wound coarsely: 0.9 mm
  Length $l_4$ of leads 102, 104 inserted into ends of bobbin 100: 0.5 mm
  Outer diameter $d_1$ of bobbin 100: 0.5 mm
  Inner diameter $d_2$ of bobbin 100: 0.3 mm
  Outer diameter $d_3$ of leads 102, 104: 0.15 mm
  Outer diameter $d_4$ of support pins 118: 0.8 mm The method of winding the platimum wire 110 will now be described. The platinum wire 110 is wound fourteen times around the densely-wound end portions of the bobbin 100. The platinum wire 110 is 20μ-thick and the spacing between one loop of platinum wire and the next is 12 μm. On the other hand, the platinum wire 110 is wound seven times around the coarsely-wound portions at either end of the bobbin so that the spacing between one loop of platinum wire and the next is 108 μm. Incidentally, it is preferable to wind the platinum wire completely up to both ends of the bobbin 100, but a sufficiently tight coil can not always be obtained at the start of winding, because winding is difficult there.

The length of the center of the bobbin 100 is about 50% of the total length, and is substantially 50% when the two end portions are added. Since the bobbin is hollow at the center, however, the volumetric ratio of the center to that of the two end portions is 40:60 (%). Accordingly, the ratio of their heat capacities is also substantially this ratio. Furthermore, since the leads 102, 104 are connected to the two end portions, heat sinks must be considered. For these reasons 20% of the total length of the platinum wire is wound around the center, that is, that portion accounting for 20% of the total resistance, 40% of the total length of the platinum wire, or 40% of the total resistance, is wound around each end portion.

Figure 5C:
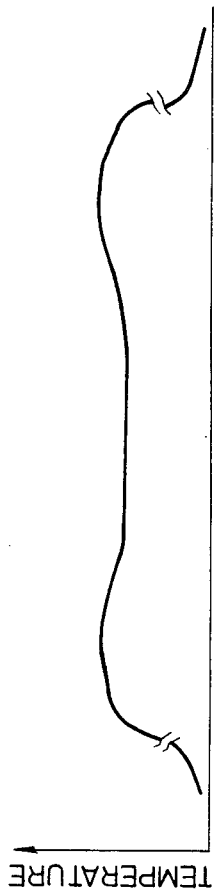
FIG. 5C is a graph of the temperature distribution along a flow rate detector.

As a result, the temperature distribution of the flow rate detector is such as shown in FIG. 5C, the temperature difference between the center and either end portion is at most 10° C., and the maximum temperature has dropped to about 200° C. The response of this embodiment was measured, with the results shown in FIG. 6. Similarly, the response of a prior-art detector produced by winding platinum wire at equal pitch (thirty-five coils with a spacing of 35 μm due to the uniform winding) is shown in FIG. 7.

Figure 6:
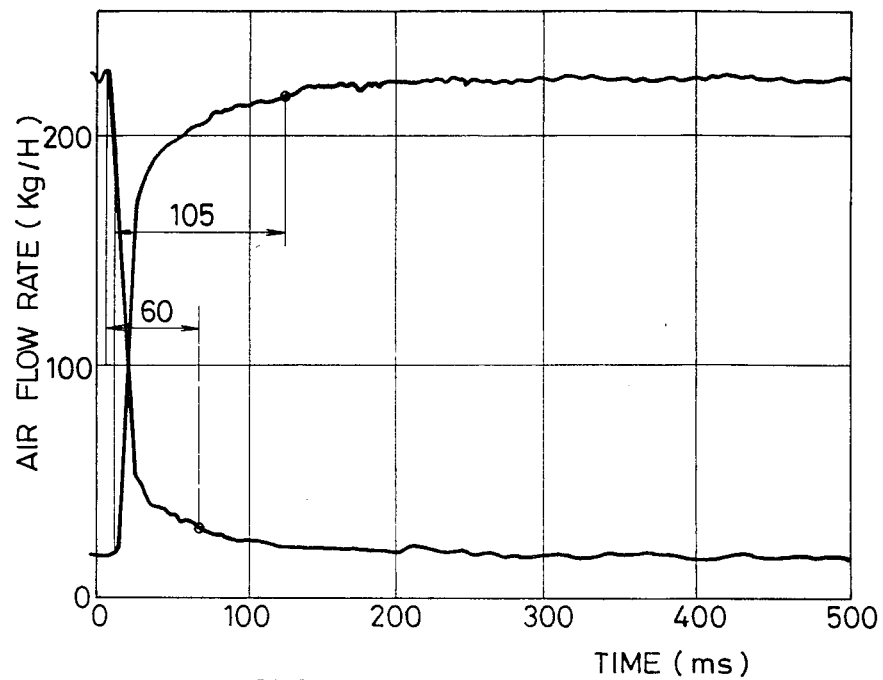
FIG. 6 is a graph of the response characteristics of one embodiment of the present invention.
Figure 7:
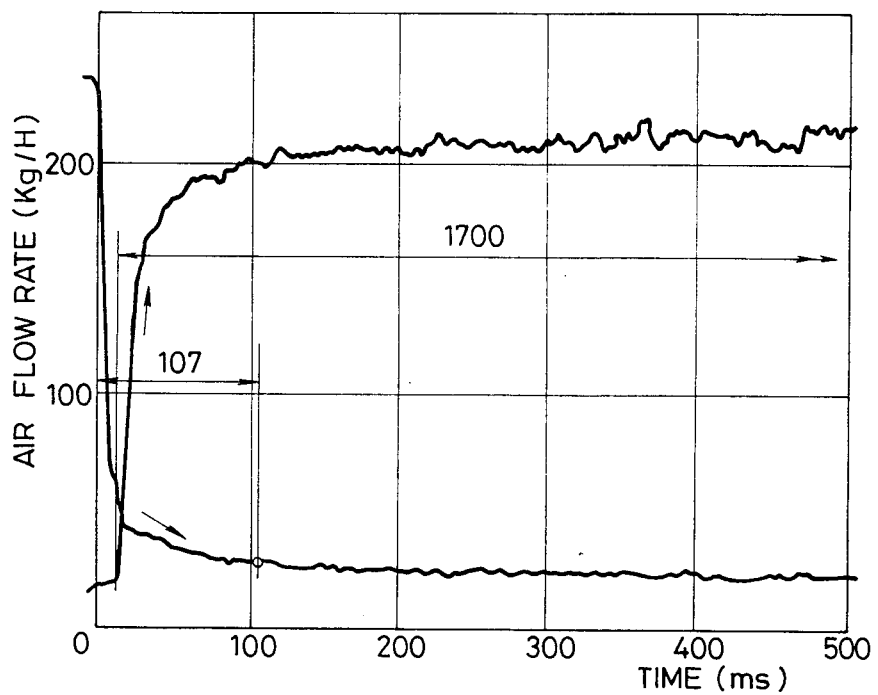
FIG. 7 is a graph of the response characteristics of a prior art flow meter.

The graphs of FIGS. 6 and 7 show the response outputs of the flow meters when the air flow rate was increased in a single step from 0 Kg/H to 200 Kg/H at time 0, and the response output of the flow meters when the air flow rate was similarly decreased in a single step from 200 Kg/H to 0 Kg/H. Numerals in the graphs show the response time 3τ after the change in flow rate until 95% of the full scale was reached. In the prior art flow meter, the rise response time was 1700 ms and the fall response time 107 ms. In the present embodiment, the rise and fall response times were improved to 105 ms and 60 ms, respectively. The rise response time, in particular, was reduced by about 1/7.

Since the rise response time is reduced, the difference between the rise response time and the fall response time is small, so that when a pulsating flow in the engine is being detected, the flow rate can be detected with an accuracy approximately that of the mean value, and the detection accuracy of the flow rate can be improved.

Figure 8:
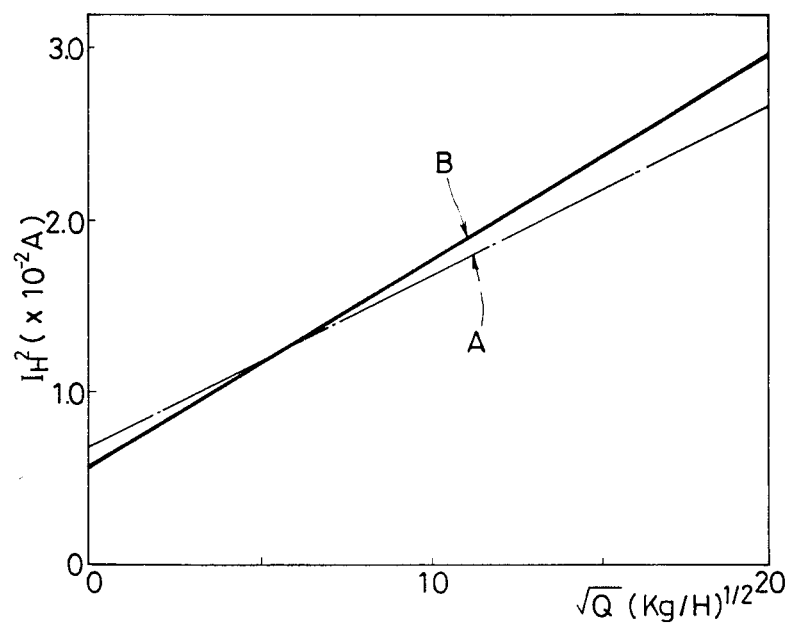
FIG. 8 is a graph comparing the characteristics of a prior art flow meter and the flow meter of the present invention.

Since the heat transferred to the air flow is increased, the sensitivity of a heat-flow sensor can be improved. FIG. 8 shows two characteristics, that is, the characteristics of a prior art sensor and those of a sensor with coarse winding, in which the square of the current $I_H$ applied to the resistor is plotted along the ordinate and the square root of the flow rate Q along the abscissa. The power consumption is reduced by 15% on the low flow-rate side for the sensor with the coarse central winding, in comparison with that of the prior art. The heat transferred to the air flow is improved by about 20% in terms of gradient, and the sensitivity can be improved.

Experiments were carried out involving changes in the winding ratios. The results are shown in Table 1.

In the prior art flow meter, the wire is wound thirty-five times at equal pitch. Example 1 is the embodiment of the invention described above in which the wire is wound densely fourteen times at either end and coarsely seven times at the center. It was found to be difficult to wind the wire more than fourteen times within a zone of the length of 0.45 mm from either end (because neighboring platinum wires come into contact with each other). Accordingly, the experiment was repeated by winding the wire thirteen times on either side and nine times at the center, without changing the overall number of windings in Example 2. This experiment provided a rise response time of 180 ms and a fall response time of 83 ms, these values are superior to those of the prior art but are inferior to those of Example 1. In other words, with Example 2, a heat sink occurs from either end, and the temperature is higher at the center than at either end so that variations occur in the temperature distribution. In Example 3, the number of windings was the same as those of Example 1, but there were two more coils at the center to increase slightly the temperature at the center. With this example, the response characteristics were substantially the same as those of Example 1.

In other words, the response can be improved by winding the wire more densely at either end than at the center. The density of the winding is preferably determined experimentally in accordance with the overall heat capacity distribution and the magnitude of the heat sink at each end.

TABLE 1

|  | Each end | Center | Total | Rise | Fall |
| --- | --- | --- | --- | --- | --- |
| Prior art | 11.3 | 11.3 | 35 | 1700 ms | 107 ms |

TABLE 1-continued

|  | Each end | Center | Total | Rise | Fall |
|---|---|---|---|---|---|
| Example 1 | 14 | 7 | 35 | 105 | 60 |
| Example 2 | 13 | 9 | 35 | 180 | 83 |
| Example 3 | 14 | 9 | 37 | 100 | 56 |

The examples described above had hollow bobbins in order to restrict any increase in the total heat capacity, and facilitate the fitting of the leads. However, the bobbin can be a cylindrical bobbin, or a support on a flat sheet. In such a case, the heat capacity is substantially uniform so that heat sinks must be primarily considered.

Figure 9:
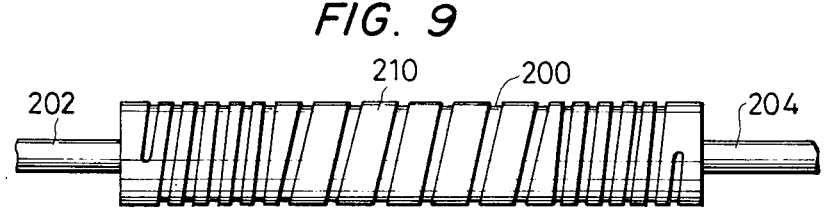
FIG. 9 is a side view of the flow rate detector of a thermal air flow meter in accordance with another embodiment of the present invention.
Figure 10:
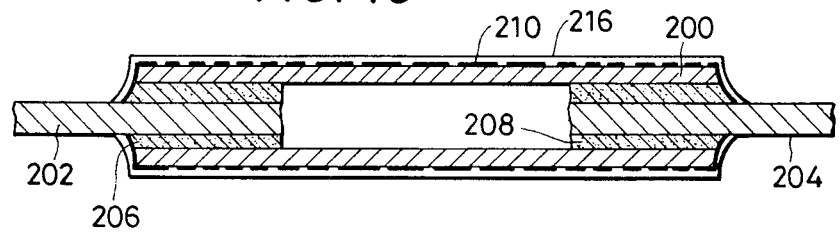
FIG. 10 is a longitudinal cross-sectional view of the detector of FIG. 9.

In the embodiment of FIGS. 9 and 10, leads 202 and 204 are inserted into both ends of a hollow bobbin 200 of an insulating material, and the bobbin 200 and the leads 202, 204 are bonded by adhesive 206, 208. A platinum film 210 is provided around the outer periphery of the bobbin 200. The platinum film 210 is spirally trimmed by a laser so that the trimming pitch is dense at either end and is coarse at the center thereof. In this manner, the resistance at either end can be made large and the resistance at the center small, even if the film is trimmed by the laser to a constant width. This arrangement makes the temperature distribution in the axial direction of the bobbin 200 constant, in the same way as in the embodiment described above. In this embodiment, the connection of the platinum film 210 to the leads 202, 204 can be done easily by forming the platinum film 210 so that it reaches the leads 202, 204.

In a thermal air flow meter of the type in which a platinum film is formed on a flat sheet, the platinum film 210 is trimmed into a zigzag such that its pitch is dense at either end and coarse at the center. Thus, substantially the same effects as those of the embodiments described above can be obtained.

In accordance with the present invention, the temperature distribution of the flow rate detector can be made substantially uniform to improve the heat transfer quantity thereof with respect to the air flow.

Accordingly, the sensitivity as well as the accuracy of the measurement of the flow rate can be improved.

The rise response time can be made faster by reducing the highest temperature of the bobbin.

Since a value approximately the same as the true value of a pulsating quantity can be detected by reducing the difference between the rise and fall response time, the accuracy of measuring flow rate can be improved.

What is claimed is:

1. In an internal combustion engine a thermal air flow meter including a flow rate detector for detecting a proportion of a flow rate of air in dependence upon heat carried away by the air the flow rate detector comprising a support means, means disposed on said support means for increasing a response time of the thermal air flow meter and improving an accuracy of the measurement of flow rate including a heat-sensitive resistor formed on said support means in such a manner that the resistance per unit length of said heat-sensitive resistor at either end of said support means is greater than the resistance per unit length of said heat-sensitive resistor at a center of said support means, and leads attached to both ends of said support means and electrically connected to said heat sensitive resistor.

2. The thermal air flow meter as defined in claim 1, wherein said heat-sensitive resistor is linear and is wound around the outer periphery of said support means in such a manner that said resistor is wound densely at either end of said support means and coarsely at the center area thereof.

3. The thermal air flow meter as defined in claim 2, wherein said support means is cylindrical, said leads are inserted into and attached to said cylindrical support, and said heat-sensitive resistor is wound densely at least over the portions corresponding to the portions at which said lead are inserted into said cylindrical support.

4. The thermal air flow meter as defined in claim 1, wherein said heat-sensitive resistor has a film-like form and is constructed by trimming a film formed on the surface of said support means, and the pitch of said trimming is such that it is dense at either end of said support means and coarse at the center of said support means.

* * * * *